United States Patent
Onishi et al.

(10) Patent No.: US 6,379,729 B1
(45) Date of Patent: *Apr. 30, 2002

(54) FOOD CONTAINING WATER-SOLUBLE COLORANT

(75) Inventors: Kuniyoshi Onishi, Asakuchi; Yutaka Higashimura, Joyo; Yoshiko Kumazawa, Ibaraki, all of (JP)

(73) Assignee: San-Ei Gen F.F.I., Inc., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,830

(22) PCT Filed: Mar. 31, 1997

(86) PCT No.: PCT/JP97/01128

§ 371 Date: Sep. 15, 1998

§ 102(e) Date: Sep. 15, 1998

(87) PCT Pub. No.: WO97/36503

PCT Pub. Date: Oct. 9, 1997

(30) Foreign Application Priority Data

Apr. 3, 1996 (JP) ............................ 8-81632

(51) Int. Cl.⁷ .................................. A23L 1/27
(52) U.S. Cl. ................ 426/250; 426/540; 426/587; 426/590
(58) Field of Search ............... 426/250, 540, 426/590, 587, 34; 8/636, 656

(56) References Cited

U.S. PATENT DOCUMENTS

| | | | |
|---|---|---|---|
| 3,515,561 A | | 6/1970 | Flesch et al. ............... 99/108 |
| 3,655,406 A | * | 4/1972 | Klaui ........................ 426/540 |
| 3,873,739 A | * | 3/1975 | Jenkins ..................... 426/164 |
| 3,886,294 A | * | 5/1975 | Emodi et al. ............... 426/540 |
| 4,115,595 A | * | 9/1978 | Jordan ...................... 426/250 |
| 4,118,516 A | * | 10/1978 | Van Praag et al. .......... 426/96 |
| 4,132,793 A | * | 1/1979 | Haber et al. ............... 426/250 |
| 4,133,900 A | * | 1/1979 | Maing et al. ............... 426/540 |
| 4,172,902 A | * | 10/1979 | Asen et al. ................ 426/250 |
| 4,208,434 A | * | 6/1980 | Iacobucci et al. ........... 426/72 |
| 4,285,982 A | * | 8/1981 | Iacobucci et al. .......... 426/250 |
| 4,320,009 A | * | 3/1982 | Hilton et al. .............. 210/651 |
| 4,476,112 A | | 10/1984 | Aversano ................... 426/652 |
| 4,481,226 A | * | 11/1984 | Crosby et al. .............. 426/540 |
| 4,500,556 A | * | 2/1985 | Langstan ................... 426/540 |
| 4,699,664 A | * | 10/1987 | Hettiarachcky et al. ..... 426/540 |
| 4,775,477 A | * | 10/1988 | Stahl et al. ................ 210/641 |
| 5,039,536 A | * | 8/1991 | Vunsh et al. .............. 426/250 |
| 5,079,016 A | * | 1/1992 | Tood, Jr. .................. 426/250 |
| 5,318,788 A | * | 6/1994 | Yokota et al. ............. 426/540 |
| 5,370,887 A | * | 12/1994 | Miyao et al. .............. 426/250 |
| 5,382,714 A | * | 1/1995 | Khachik .................... 568/834 |
| 5,607,707 A | * | 3/1997 | Ford et al. .................. 426/2 |
| 5,908,650 A | * | 6/1999 | Lenoble et al. ............ 426/262 |

FOREIGN PATENT DOCUMENTS

| | | |
|---|---|---|
| JP | 50-69262 | 6/1975 |
| JP | 54008770 | 1/1979 |
| JP | 59013725 | 1/1984 |
| JP | 61072068 | 4/1986 |
| JP | 61265067 | 11/1986 |
| JP | 02110164 | 4/1990 |
| JP | 02214780 | 8/1990 |
| JP | 06217732 | 8/1994 |
| JP | 06508034 | 9/1994 |

OTHER PUBLICATIONS

Datzberger, Karin, et al. "The influence of wine additives on colour and colour quality of young red wine," Dec. 10, 1991, pp. 524–526.

Akio Tanimura, et al. "Handbook for Natural Food Colors (in Japanese)," (kohrin) 1989, pp. 324–330 and its partial English translation.

Shinnosuke Kishi. "Manual for Food Additives (in Japanese)" (Shokuhin to Kagaku Sha) 1964, pp. 192–193, 141 and its partial English translation.

* cited by examiner

Primary Examiner—Nina Bhat
(74) Attorney, Agent, or Firm—Sughrue Mion, PLLC

(57) ABSTRACT

Disclosed is a water-soluble color-stabilized food containing ascorbic acid or its salt and at least one water-soluble color selected from the group consisting of coal-tar color, anthocyanin color and carthamus yellow, said food further containing sorbic acid and/or its salt and/or a salt of sulfurous acid so that the fading of the water-soluble color can be prevented and the stability thereof can be increased.

10 Claims, No Drawings

FOOD CONTAINING WATER-SOLUBLE COLORANT

This application claims benefit under 35 U.S.C. 371 of PCT/JP97/01128, filed Mar. 31, 1997.

FIELD OF THE INVENTION

The present invention relates to a water-soluble color-stabilized food containing ascorbic acid or its salt and at least one water-soluble color selected from the group consisting of coal-tar color, anthocyanin color and carthamus yellow, and particularly concerns with said food further containing sorbic acid and/or its salt or a salt of sulfurous acid so that the water-soluble color can be stably retained.

The present invention also relates to a water-soluble color-stabilized food containing ascorbic acid or its salt and at least one water-soluble color selected from the group consisting of coal-tar color, anthocyanin color and carthamus yellow, and particularly concerns with said food further containing sorbic acid and/or its salt and a salt of sulfurous acid so that the water-soluble color can be stably retained.

BACKGROUND ART

Color additives have been widely used for various products such as foods, pharmaceutical compositions, quasi-drugs, cosmetics, livestock feeds and so on. Colors widely used include synthetic colors with assured safety such as coal-tar color; and naturally occurring colors (hereinafter referred to as "natural colors") such as anthocyanin color, flavonoid color, quinone color, betacyanine color and azaphyllone color.

However, these colors are known to discolor or fade due to photolysis by light irradiation, oxidation, heat or the like. In recent years, there is a tendency to pale the color of a food using a reduced amount of a color for representation of naturalness. As a food color becomes paler, the food discolors or fades more markedly by exposure to light, air oxidation, heat or the like. Therefore, the prevention of color fading is now more important than before.

Various measures have been considered to prevent the discoloration and fading due to colors with poor stability (an effect of preventing the discloration and fading will be hereinafter referred to as "stabilizing effect"). For example, the addition of specific materials has been proposed for stabilization of colors. Typical examples of such materials are synthetic compounds such as dibutylhydroxytoluene (BHT); ascorbic acid/erythorbic acid, and their derivatives; naturally occurring flavonoids such as catechin and chlorogenic acid; sulfurous acid (Adams, J. B., and Ongley, M. H., Campden Food Pres. Res. Assoc., Tech. Bull., p.23 (1972)) and the like.

The use of synthetic compounds, e.g. dibutylhydroxytoluene (BHT), tends to abate with the increase of nature-oriented tendency.

Ascorbic acid/erythorbic acid and their derivatives stabilize only a limited colors such as carotenoid colors. Moreover, when used for other colors, these compounds promote the fading of other colors, far from stabilizing other colors. This problem may arise in foods originally containing ascorbic acid or the like. Recently ascorbic acid or like vitamin C components are profusely incorporated into foods to improve the nutrition level, posing a serious problem of color fading (Comparative Examples 1–3).

Naturally occurring flavonoids such as tea extracts containing catechin, chlorogenic acid contained in coffee or sunflower seeds and caffeic acid derivatives produce a low stabilizing effect, especially a low thermally stabilizing effect.

Sulfurous acid reportedly effectively inhibits the fading of anthocyanin colors (Z Lebensm Unters Forsch (1992) 194, 524–526). When used singly, sulfurous acid gives only a low stabilizing effect. When used in a large amount to increase the stabilizing effect, sulfurous acid significantly impairs the flavor of the food and may accelerate the fading of anthocyanin colors in the food (Ditto, FIG. 2).

A salt of sorbic acid is generally used as a preservative and scarcely stabilizes water-soluble colors when used singly. In other words, a salt of sorbic acid is not known as a color stabilizer.

Currently there is a demand for a method of coloring a food with a color so stabilized as to avoid discoloring or fading, especially a demand for means for stably coloring a food with a color without a likelifood of discoloring or fading, when ascorbic acid is originally contained in the food or added in a large amount.

Therefore, it is desired to develop a method of stabilizing a color in a food to effectively prevent the discoloration and fading and to give the color a high resistance to light and heat.

DISCLOSURE OF THE INVENTION

The present inventors conducted extensive research to overcome the foregoing problems and found the following. When a food is colored with at least one water-soluble color selected from the group consisting of coal-tar color, anthocyanin color and carthamus yellow, the food is stably colored with said color(s) by incorporating sorbic acid and/or its salt or a salt of sulfurous acid into the food, especially into the food containing ascorbic acid or its salt.

The following was also discovered. When a food is colored with at least one water-soluble color selected from the group consisting of coal-tar color, anthocyanin color and carthamus yellow, a higher stabilizing effect is exhibited and high light and heat resistances not heretofore attained are shown by the water-soluble color when sorbic acid and/or its salt and a salt of sulfurous acid are incorporated into the food, especially into the food containing ascorbic acid or its salt. Based on these novel findings, the present invention was completed.

The foods of the invention contain ascorbic acid or its salt, and are colored with at least one water-soluble color selected from the group consisting of coal-tar color, anthocyanin color and carthamus yellow.

Specific examples of such foods are non-alcoholic drinks such as lactic acid beverages, lactic fermenting beverages, concentrated dairy beverages, fruit juice drinks, non-fruit juice drinks, fruit flesh drinks, functional drinks, clear carbonated drinks, fruit juice-containing carbonated drinks, fruit-colored carbonated drinks and like soft drinks; alcoholic drinks such as wine, wine soda, liqueur and cocktail; ices such as ice cream, popsicle-style ice candies and sherbets; Japanese-style confections such as rice crackers, those seasoned with soy sauce, millet-and-rice cakes, steamed buns and candies; Western-style cakes such as cookies, biscuits, crackers, pies, sponge cakes, Castella, doughnuts, waffles, custard puddings, caramels, candies, chewing gums, jellies, hot cakes and bread; snack foods such as potato chips; dairy products such as fruit yogurt and cheese; soybean processed foods such as bean milk; marmalade, jam, conserves and fruit syrup; pickles; meat-processed products such as hams, sausages, bacons, dry sausages and beef jerkies; fishery products such as fish-hams, fish-sausages, boiled fish paste, tubular rolls of fish paste, light puffy cakes made of ground fish and deep-fried fish; dried fishery products; sea foods such as seasoned sea-urchin eggs, squid guts pickled in salt and dried shellfish; products boiled in sweetened soy sauce, the products being inclusive of seasoned seaweeds, small fish, shellfish, dried cuttlefish, vegetables, edible wild plants, mushrooms and sea tangles; curried foods such as instant curry and retort curry (retort pouch foods); seasonings such as ketchup and mayonnaise; foods for electronic oven and frozen foods.

The foods for use in the present invention include foods containing ascorbic acid or its salt as the component of raw materials for foods and foods with ascorbic acid or its salts incorporated therein to improve the nutritive condition. These foods are found to contain ascorbic acid or its salt when analyzed to determine food components by a method (such as disclosed in "Method of Analyzing Food Additives in Foods", edited by the Ministry of Health and Welfare, Environmental Health Bureau, food chemistry section, issued by Kodansha Co., Ltd., 4th edition, pp. 283–302).

The term "ascorbic acid" used herein refers to ascorbic acid or erythorbic acid. The term "salt of ascorbic acid" is used herein to mean at least one member selected from the group consisting of sodium salt, potassium salt and calcium salt of ascorbic acid or erythorbic acid.

The result as contemplated by the invention can be achieved when ascorbic acid or its salt is contained in the food in an amount of preferably at least 0.001% by weight, more preferably 0.001 to 0.1% by weight, based on the total amount of the food. The use in excess of 0.1% by weight tends to promote the color fading.

The water-soluble color for coloring the foods of the invention is at least one water-soluble color selected from the group consisting of coal-tar color, anthocyanin color and carthamus yellow. Among said species, coal-tar color shows a marked stability to light. These colors may be used in the food either alone or in combination. The foregoing colors may be used in mixture with other natural colors or with plants, animal bodies, microorganisms, their processed products, their pressed juice, refined products of their extracts, etc. all of which contain natural colors. Examples of the other natural colors are cochineal extract, shikon color, madder color, lac color and like quinone colors; Japanese persimmon color, carob germ color, licorice oil extract, sandal wood red, sappan color and like flavonoid colors; beet red and like betacyanine colors; monascus yellow, monascus red and like azaphyllone colors; turmeric oleoresin, kusagi color, gardenia blue, gardenia yellow, gardenia red, spirulina color, etc.

Examples of the coal-tar color to be used in the present invention are Acid Red 27, Acid Red 51, Food Red 17, Acid Red 18, Acid Red 92, Acid Red 94, Acid Red 52, Acid Yellow 23, Food Yellow 3, Food Blue 2, Acid Blue 74, Food Green 3, etc. all of which are food colors.

Examples of the anthocyanin color useful in the present invention are red cabbage color, red rice color, elderberry color, cowberry color, gooseberry color, cranberry color, salmonberry color, perilla color, thimbleberry color, strawberry color, dark sweet cherry color, cherry color, hibiscus color, black huckleberry color, grape juice color, grape skin color, black currant color, black berry color, blueberry color, plum color, whortleberry color, boysenberry color, mulberry color, purple sweet potato color, purple corn color, purple yam color, raspberry color, red currant color, loganberry color, red radish color and so on.

A salt of sorbic acid to be used in the present invention is any one wherein a salt is combined with sorbic acid by ionic bond. Examples of the salt are sodium salt, potassium salt, calcium salt, etc. The sorbic acid or its salts may be used either alone or in combination. A preferred amount of sorbic acid or its salt to be used is 0.1 to 300 ppm. More than 300 ppm would not increase the effect of preventing the color fading, whereas less than 0.1 ppm would fail to produce the effect contemplated by the invention. A more preferred amount is 25–300 ppm which gives the result of the invention in a remarkable degree.

The salt of sulfurous acid to be used herein is at least one member selected from the group consisting of sodium sulfite, sodium hyposulfite, sulfur dioxide, potassium pyrosulfite, sodium pyrosulfite, potassium hydrogensulfite and sodium hydrogensulfite. The amount of a salt of sulfurous acid to be used is preferably 0.1 to 200 ppm, more preferably 1 to 200 ppm. Less than 0.1 ppm would fail to fully produce the contemplated effect of the invention, and more than 200 ppm would be likely to pronouncedly impair the flavor of the food because the flavor peculiar to sulfurous acid salt prevails.

When sorbic acid and/or its salt is used in combination with a sulfurous acid salt, the ratio (weight ratio) of sorbic acid and/or its salt:sulfurous acid salt is in the range of preferably from 1:10 to 100:1, more preferably from 1:1 to 10:1.

According to the present invention, the color of a food is stabilized by incorporating sorbic acid and/or its salt or a salt of sulfurous acid into the food, the food containing ascorbic acid or its salt and being colored with at least one water-soluble color selected from the group consisting of coal-tar color, anthocyanin color and carthamus yellow.

According to the present invention, the color of a food is stabilized by incorporating sorbic acid and/or its salt and a salt of sulfurous acid into the food, the food containing ascorbic acid or its salt and being colored with at least one water-soluble color selected from the group consisting of coal-tar color, anthocyanin color and carthamus yellow.

Optionally the sorbic acid and/or its salt and/or a salt of sulfurous acid may be incorporated into food materials in the course of manufacturing the food or may be incorporated into water-soluble colors in the course of production or into additives or the like.

The present invention is practiced not only for foods but for other products containing ascorbic acid or its salt and a water-soluble color. Examples of such products include pharmaceutical compositions, quasi-drugs, cosmetics and livestock feeds. The water-soluble color in these products can be stabilized according to the present invention.

Specific examples of said products are tablets, capsules, health drinks, lozenges, gargles, tooth paste, stomatic soft drinks, halitosis preventives, skin lotion, etc. The colors derived from components of such products as well as the water-soluble colors added can be stabilized according to the invention. In the case of livestock feeds, it is possible according to the invention to stabilize not only the water-soluble colors added but colors originated in components of cat foods, dog foods, feeds for ornamental fish, feeds for cultured fish and the like.

BEST MODE FOR CARRYING OUT THE INVENTION

The present invention will be described below in more detail with reference to the following Experiment Examples, Examples and Comparative Examples. However, the invention is not limited to the Examples at all.

EXPERIMENT EXAMPLE 1

Aqueous solutions containing 0.03% or 0.1% of ascorbic acid and adjusted to a pH of 2.6 were prepared. Added to each solution was 0.001% of Acid Yellow 23 (coal-tar color) as a color additive for foods with or without addition of potassium sorbate and/or sodium sulfite as shown below in items (1) to (4). The obtained solutions were tested for light resistance. The results are shown in Table 1.

(1) 15 ppm of sodium sulfite alone,
(2) 50 ppm of potassium sorbate alone,
(3) 15 ppm of sodium sulfite and 50 ppm of potassium sorbate, or
(4) absence of sodium sulfite and potassium sorbate Conditions for the Light Resistance Test The solutions were irradiated with ultraviolet light for three hours and the fading degree was measured with a fade meter (manufactured by Suga Tester Co., Ltd., a long-life fade meter, FML-Model 3).

TABLE 1

(amended)

| Ascorbic acid (%) | | Sodium sulfite (ppm) | Potassium sorbate (ppm) | Remaining color ratio (%) |
|---|---|---|---|---|
| 0.03% | (1) | 15 | 0 | 46.6 |
| | (2) | 0 | 50 | 78.8 |
| | (3) | 15 | 50 | 92.5 |
| | (4) | 0 | 0 | 19.3 |
| 0.1% | (1) | 15 | 0 | 10.6 |
| | (2) | 0 | 50 | 10.9 |
| | (3) | 15 | 50 | 70.2 |
| | (4) | 0 | 0 | 0.0 |

The results of Table 1 show that the ascorbic acid-containing solutions incorporating either or both of sodium sulfite and potassium sorbate had a higher remaining color ratio and a higher light resistance than the solutions free of both sodium sulfite and potassium sorbate. The solutions incorporating both of sodium sulfite and potassium sorbate showed significantly superior stability to light.

COMPARATIVE EXAMPLE 1

Aqueous solutions free of ascorbic acid or containing 0.03 or 0.1% of ascorbic acid were prepared under the same conditions as in Experiment Example 1 without addition of potassium sorbate and sodium sulfite, and were tested for light resistance. The results are shown in Table 2.

TABLE 2

| Ascorbic acid (%) | Sodium sulfite (ppm) | Potassium sorbate (ppm) | Remaining color ratio (%) |
|---|---|---|---|
| 0 | 0 | 0 | 83.8 |
| 0.03 | | | 19.3 |
| 0.1 | | | 0.0 |

The results of Table 2 show that the more the amount of ascorbic acid in the solution of Acid Yellow 23 (coal-tar color) is, the lower the remaining color ratio is and the higher the degree of color fading is.

EXPERIMENT EXAMPLE 2

Aqueous solutions containing 0.03% or 0.1% of ascorbic acid and adjusted to a pH of 2.6 were prepared. To each solution was added 0.0005% of Food Blue 2 (coal-tar color) as a food additive with or without addition of potassium sorbate and/or sodium sulfite as shown below in items (1) to (4). The obtained solutions were tested for light resistance. The results are shown in Table 3.

(1) 15 ppm of sodium sulfite alone,
(2) 300 ppm of potassium sorbate alone,
(3) 15 ppm of sodium sulfite and 300 ppm of potassium sorbate, or
(4) absence of sodium sulfite and potassium sorbate Conditions for the Light Resistance Test The solutions were irradiated with ultraviolet light for three hours and the fading degree was measured with a fade meter (manufactured by Suga Tester Co., Ltd., a long-life fade meter, FML-Model 3).

TABLE 3

| Ascorbic acid (%) | | Sodium sulfite (ppm) | Potassium sorbate (ppm) | Remaining color ratio (%) |
|---|---|---|---|---|
| 0.03% | (1) | 15 | 0 | 24.2 |
| | (2) | 0 | 300 | 61.6 |
| | (3) | 15 | 300 | 98.2 |
| | (4) | 0 | 0 | 0.0 |
| 0.1% | (1) | 15 | 0 | 23.6 |
| | (2) | 0 | 300 | 0.0 |
| | (3) | 15 | 300 | 44.5 |
| | (4) | 0 | 0 | 0.0 |

The results of Table 3 show that all of 0.03% ascorbic acid-containing solutions incorporating either or both of sodium sulfite and potassium sorbate had a higher remaining color ratio and exhibited a higher light resistance than the ascorbic acid-containing solution free of both sodium sulfite and potassium sorbate. The solution incorporating both of sodium sulfite and potassium sorbate had a significantly high light resistance. The 0.1% ascorbic acid-containing solution showed a remaining color ratio increased from zero to 44.5% by incorporating both of sodium sulfite and potassium sorbate.

COMPARATIVE EXAMPLE 2

Aqueous solutions free of ascorbic acid or containing 0.03 or 0.1% of ascorbic acid were prepared under the same conditions as in Experiment Example 2 without incorporation of potassium sorbate and sodium sulfite, and were tested for light resistance. The results are shown in Table 4.

Conditions for the Light Resistance Test

The solutions were irradiated with ultraviolet light for three hours and the fading degree was measured with a fade meter (manufactured by Suga Tester Co., Ltd., a long-life fade meter, FML-Model 3).

TABLE 4

| Ascorbic acid (%) | Sodium sulfite (ppm) | Potassium sorbate (ppm) | Remaining color ratio (%) |
|---|---|---|---|
| 0 | 0 | 0 | 73.2 |
| 0.03 | | | 0.0 |
| 0.1 | | | 0.0 |

The results of Table 4 show that the remaining color ratio showed zero when ascorbic acid was present in the solution of Food Blue 2 (coal-tar color). This denotes that the color faded away.

EXPERIMENT EXAMPLE 3

Aqueous solutions containing 0.03% or 0.1% of ascorbic acid and adjusted to a pH of 2.6 were prepared. To each solution was added 0.05% of red cabbage color (anthocyanin color) with or without addition of potassium sorbate and/or sodium sulfite as shown below in items (1) to (4). The obtained solutions were tested for light resistance. The results are shown in Table 5.

(1) 15 ppm of sodium sulfite alone,
(2) 50 ppm of potassium sorbate alone,
(3) 15 ppm of sodium sulfite and 50 ppm of potassium sorbate, or
(4) absence of sodium sulfite and potassium sorbate Conditions for the Light Resistance Test The solutions were irradiated with ultraviolet light for three hours and the fading degree was measured with a fade meter (manufactured by Suga Tester Co., Ltd., a long-life fade meter, FML-Model 3).

TABLE 5

| Ascorbic acid (%) | | Sodium sulfite (ppm) | Potassium sorbate (ppm) | Remaining color ratio (%) |
|---|---|---|---|---|
| 0.03% | (1) | 15 | 0 | 79.9 |
| | (2) | 0 | 50 | 46.6 |
| | (3) | 15 | 50 | 89.5 |
| | (4) | 0 | 0 | 25.7 |
| 0.1% | (1) | 15 | 0 | 72.4 |
| | (2) | 0 | 50 | 41.9 |
| | (3) | 15 | 50 | 84.8 |
| | (4) | 0 | 0 | 24.6 |

The results of Table 5 show that the ascorbic acid-containing solutions incorporating either or both of sodium sulfite and potassium sorbate had a higher remaining color ratio than the solutions free of sodium sulfite and potassium sorbate. The solutions incorporating both of sodium sulfite and potassium sorbate showed a pronouncedly high remaining color ratio and superior stability.

COMPARATIVE EXAMPLE 3

Aqueous solutions free of ascorbic acid or containing 0.03 or 0.1% of ascorbic acid were prepared under the same conditions as in Experiment Example 3 without incorporation of potassium sorbate and sodium sulfite, and were tested for light resistance. The results are shown in Table 6.

Conditions for the Light Resistance Test

The solutions were irradiated with ultraviolet light for three hours and the fading degree was measured with a fade meter (manufactured by Suga Tester Co., Ltd., a long-life fade meter, FML-Model 3).

TABLE 6

| Ascorbic acid (%) | Sodium sulfite (ppm) | Potassium sorbate (ppm) | Remaining color ratio (%) |
|---|---|---|---|
| 0 | 0 | 0 | 59.2 |
| 0.03 | | | 25.7 |
| 0.1 | | | 24.6 |

The results of Table 6 show that the more the amount of ascorbic acid in the solution of red cabbage color (anthocyanin color) is, the lower the remaining color ratio is and the higher the fading degree is.

EXPERIMENT EXAMPLE 4

Aqueous solutions containing 45 ppm of ascorbic acid and adjusted to a pH of 2.6 were prepared. To each solution were added 0.05% of red cabbage color (anthocyanin color) or 0.1% of elderberry color (anthocyanin color) and potassium sorbate alone or in combination with sodium sulfite as shown below in items (1) to (4). The obtained solutions were tested for heat resistance. The results are shown in Table 7.

Lemon juice in a proportion of 10% containing 450 ppm of ascorbic acid (45 ppm calculated as ascorbic acid) was added.

(1) 200 ppm of potassium sorbate alone, and
(2) 15 ppm of sodium sulfite and 200 ppm of potassium sorbate Conditions for the Heat Resistance Test The solutions were stored at 45° C. for 3 weeks.

TABLE 7

| Name of color | | Sodium sulfite (ppm) | Potassium sorbate (ppm) | Remaining color ratio (%) |
|---|---|---|---|---|
| Elderberry | (1) | 0 | 200 | 47.5 |
| color | (2) | 15 | 200 | 73.3 |
| Red cabbage | (1) | 0 | 200 | 88.3 |
| color | (2) | 15 | 200 | 97.2 |

The results of Table 7 show that the heat resistance of elderberry color or red cabbage color (anthocyanin color) was increased by the incorporation of both sodium sulfite and potassium sorbate in the solution containing 45 ppm of ascorbic acid derived from lemon juice.

EXPERIMENT EXAMPLE 5

Aqueous solutions containing 0.03% of ascorbic acid and adjusted to a pH of 2.6 were prepared. To each solution were added 0.04% of carthamus yellow (E 10%=160) with or without the addition of potassium sorbate and sodium sulfite. The obtained solutions were tested for light resistance. The results are shown in Table 8. Table 8 also shows, as a comparative example, the results of an aqueous solution free of potassium sorbate and sodium sulfite.

(1) 7.5 ppm of sodium sulfite and 300 ppm of potassium sorbate, or
(2) absence of sodium sulfite and potassium sorbate Conditions for the Light Resistance Test The solutions were irradiated with ultraviolet light for three hours and the fading degree was measured with a fade meter (manufactured by Suga Tester Co., Ltd., a long-life fade meter, FML-Model 3).

TABLE 8

| Ascorbic acid | PA | Sodium sulfite (ppm) | Potassium sorbate (ppm) | Remaining color ratio (%) |
|---|---|---|---|---|
| 0.03 | (1) | 7.5 | 300 | 58.0 |
| | (2) | 0 | 0 | 30.5 |

The results of Table 8 show that the ascorbic acid-containing solution was imparted a high remaining color ratio and an improved light resistance by the incorporation of sodium sulfite and potassium sorbate.

EXAMPLE 1

Orange Juice-Containing Soft Drink

| Formulation | |
|---|---|
| 1. High fructose corn syrup | 1,250 (g) |
| 2. Citric acid (crystal) | 20 |
| 3. Orange juice (concentrated to ⅕) | 220 |
| 4. Orange flavor | 10 |
| 5. Food Yellow 3 | 0.2 |
| 6. Vitamin C | 5.0 |
| 7. Sodium sulfite | 0.15 |

Water was added to the above components to give 10 liters of a mixture.

An orange juice solution was prepared according to the foregoing formulation and instantaneously sterilized at 93° C. by a plate sterilizer, filled into a container and cooled to produce an orange juice-containing soft drink. The soft drink thus obtained retained a vivid color after 3-month storage at 40° C. An orange juice-containing soft drink was prepared as a control from the same components as above with the exception of not using sodium sulfite (component 7 in the formulation). The soft drink was given a faded color after 3-month storage at 40° C.

EXAMPLE 2

Lemon Candy

| Formulation | |
|---|---|
| 1. Sugar | 600 (g) |
| 2. Starch syrup (75%) | 400 |
| 3. Water | 200 |
| 4. Citric acid (crystal) | 1.5 |
| 5. Lemon juice (concentrated to ⅕) | 20 |
| 6. Lemon flavor | 2.0 |
| 7. Acid Yellow 3 | 0.01 |
| 8. Sodium sulfite | 0.005 |
| 9. Potassium sorbate | 0.05 |

The components 1, 2 and 3 in the above formulation were boiled to 150° C. and left to cool to 120° C. The components 4–9 were added and lemon candy was formed from the mixture. The lemon candy thus obtained retained a vivid color after 6-month storage at room temperature. Lemon candy free of components 8 and 9 in the formulation was prepared and imparted a faded color after 6-month storage at room temperature.

EXAMPLE 3

Grape Carbonated Drink

| Formulation | |
|---|---|
| 1. High fructose corn syrup | 800 (g) |
| 2. Sugar | 400 |
| 3. Citric acid (crystal) | 1.0 |
| 4. Grape flavor | 1.3 |
| 5. Red cabbage color | 5.0 |
| 6. Vitamin C | 3.0 |
| 7. Sodium sulfite | 0.15 |
| 8. Potassium sorbate | 0.50 |

The above components were dissolved in water and additional water was added to the solution to give 2 liters of syrup. The syrup was instantaneously sterilized at 93° C. by a plate sterilizer. Carbonated water was added in an amount of 80 parts by weight to 20 parts by weight of the syrup. The mixture was placed into a container to produce grape carbonated drink. The beverage thus obtained retained a vivid color without change of color after 3-month storage at 40° C. Grape carbonated drink free of sodium sulfite and potassium sorbate (components of items 7 and 8 in the formulation) was produced and imparted a faded grape color after 3-month storage at 40° C.

EXAMPLE 4

Melon Jelly

| Formulation | |
|---|---|
| 1. Sugar | 500 (g) |
| 2. High fructose corn syrup | 2,000 |
| 3. Melon juice (concentrated to ⅕) | 400 |
| 4. Gelling agent | 100 |
| 5. Citric acid (crystal) | 15 |
| 6. Melon flavor | 15.0 |
| 7. Carthamus yellow | 3.0 |
| 8. Gardenia blue | 2.0 |
| 9. Vitamin C | 10 |
| 10. Sodium sulfite | 0.2 |
| 11. Potassium sorbate | 0.2 |

Water was added to the above components to give 10 kg of a mixture.

The components 1, 2 and 4 were dissolved in water with stirring at 80° C. for 10 minutes. The components 3, and 5–11 were added to the solution and mixed. The mixture was placed into a container and sterilized at 85° C. for 30 minutes,, giving melon jelly. The jelly retained a melon color without change of color after 3-month storage at room temperature. Melon jelly free of components 10 and 11 in the formulation was produced and was given a faded melon color after 3-month storage at room temperature.

EXAMPLE 5

Chilled Strawberry Jelly

| Formulation | |
|---|---|
| 1. Sugar | 500 (g) |
| 2. High fructose corn syrup | 1,500 |
| 3. Strawberry juice (concentrated to ⅕) | 600 |
| 4. Gelling agent | 80 |
| 5. Citric acid (crystal) | 15 |
| 6. Strawberry flavor | 15.0 |
| 7. Purple sweet potato color | 5.0 |
| 8. Carthamus yellow | 1.0 |

-continued

| Formulation | |
|---|---|
| 9. Vitamin C | 10 |
| 10. Potassium sorbate | 0.50 |

Water was added to the above components to give 10 kg of a mixture.

The components 1, 2 and 4 were dissolved in water with stirring at 80° C. for 10 minutes. The components 3 and 5–10 were added to the solution and mixed. The mixture was placed into a container and chilled to produce chilled strawberry jelly. The jelly retained a vivid strawberry color without fading after 3-month storage in a refrigerator. Chilled strawberry jelly free of the component 10 in the formulation was produced and imparted a faded strawberry color after 3-month storage in a refrigerator.

POTENTIAL INDUSTRIAL USE OF THE INVENTION

The present invention is directed to a water-soluble color-stabilized food containing ascorbic acid or its salt and at least one water-soluble color selected from the group consisting of coal-tar color, anthocyanin color and carthamus yellow, more particularly to the food further containing sorbic acid and/or its salt or a salt of sulfurous acid so that the water-soluble color can be stably retained.

The present invention is directed to a water-soluble color-stabilized food containing ascorbic acid or its salt and at least one water-soluble color selected from the group consisting of coal-tar color, anthocyanin color and carthamus yellow, more particularly to the food further containing sorbic acid and/or its salt and a salt of sulfurous acid so that the water-soluble color can be stably retained.

What is claimed:

1. A food containing a water-soluble colorant comprising ascorbic acid or its salt in an amount of 0.001 to 0.1% by weight based on food weight, and at least one water-soluble color selected from the group consisting of coal-tar color, anthocyanin color and carthamus yellow, said color-stabilized food further containing, based on the food weight, (i) 1 to 200 ppm of a salt of sulfurous acid and (ii) at least 0.1 ppm of sorbic acid and/or its salt.

2. A food containing a water-soluble colorant as claimed in claim 1, containing sorbic acid and/or its salt in an amount of at least 25 ppm based on food weight.

3. A food containing a water-soluble colorant comprising ascorbic acid or its salt in an amount of 0.001 to 0.1% by weight based on food weight, and at least one water-soluble color selected from the group consisting of coal-tar color, anthocyanin color and carthamus yellow, said color-stabilized food further containing, based on the food weight, (i) 1 to 200 ppm of a salt of sulfurous acid and (ii) 0.1 to 300 ppm of sorbic acid and/or its salt based on food weight.

4. A food containing a water-soluble colorant as claimed in claim 3, containing sorbic acid and/or its salt in an amount of 25 to 300 ppm based on food weight.

5. A food containing a water-soluble colorant as claimed in claim 3, wherein the food is selected from the group consisting of a beverage, confection, a marmalade, a jam, conserves, fruit syrup, a pickle, and a milk product.

6. A method for stabilizing the color of a food composition containing 0.001 to 0.1 wt. % of ascobic acid or its salt based on food weight and at least one water soluble color selected from the group consisting of coal-tar color, anthocyanin color and carthamus yellow, the method comprising adding, based on food weight, (i) 1 to 200 ppm of a salt of sulfurous acid and (ii) at least 0.1 ppm of sorbic acid and/or its salt to the food composition.

7. The method for stabilizing the color according to claim 6 wherein the sorbic acid or its salt is added in an amount of at least 25 ppm based on food weight.

8. A method for stabilizing the color of a food composition containing 0.001 to 0.1 wt. % of ascorbic acid or its salt based on food weight and at least one water soluble color selected from the group consisting of coal-tar color, anthocyanin color and carthamus yellow, the method comprising adding, based on food weight, (i) 1 to 200 ppm of a salt of sulfurous acid and (ii) 0.1 to 300 ppm of sorbic acid and/or its salt to the food composition.

9. The method for stabilizing the color according to claim 8 wherein the sorbic acid and/or its salt is added in an amount of 25 to 300.

10. A beverage, a confection or a milk product containing a water-soluble colorant comprising ascorbic acid or its salt in an amount of 0.001 to 0.1% by weight based on food weight, and at least one water-soluble color selected from the group consisting of coal-tar color, anthocyanin color and carthamus yellow, said color-stabilized food further containing, based on the food weight, (i) 1 to 200 ppm of a salt of sulfurous acid and (ii) at least 0.1 ppm of sorbic acid and/or its salt.

* * * * *